US011335116B2

(12) United States Patent
Lee

(10) Patent No.: US 11,335,116 B2
(45) Date of Patent: May 17, 2022

(54) APPARATUS AND METHOD FOR IDENTIFYING FAKE FINGERPRINT BY USING IMPEDANCE

(71) Applicant: Seung Jin Lee, Yongin-si (KR)

(72) Inventor: Seung Jin Lee, Yongin-si (KR)

( * ) Notice: Subject to any disclaimer, the term of this patent is extended or adjusted under 35 U.S.C. 154(b) by 0 days.

(21) Appl. No.: 16/631,379

(22) PCT Filed: Jul. 4, 2018

(86) PCT No.: PCT/KR2018/007548
§ 371 (c)(1),
(2) Date: Jan. 15, 2020

(87) PCT Pub. No.: WO2019/017621
PCT Pub. Date: Jan. 24, 2019

(65) Prior Publication Data
US 2020/0143142 A1 May 7, 2020

(30) Foreign Application Priority Data

Jul. 20, 2017 (KR) .......................... 10-2017-0092035

(51) Int. Cl.
*G06V 40/12* (2022.01)
*G06V 40/13* (2022.01)
(52) U.S. Cl.
CPC ...... *G06V 40/1382* (2022.01); *G06V 40/1306* (2022.01)
(58) Field of Classification Search
CPC ............. G06K 9/00–0012; G06V 40/12–1394
See application file for complete search history.

(56) References Cited

U.S. PATENT DOCUMENTS

| 8,666,126 B2 | 3/2014 | Lee et al. |
| 9,633,269 B2 | 4/2017 | Gu et al. |
| 9,639,765 B2 | 5/2017 | Du et al. |

(Continued)

FOREIGN PATENT DOCUMENTS

| JP | H10-302047 A | 11/1998 |
| JP | 2000-123143 A | 4/2000 |

(Continued)

*Primary Examiner* — Roberto W Flores
(74) *Attorney, Agent, or Firm* — Rabin & Berdo, P.C.

(57) ABSTRACT

The present invention relates to an apparatus and method for identifying a fake fingerprint by using impedance, which enables identification of a fingerprint or fake fingerprint by measuring an impedance value of a fake fingerprint made of silicon or gelatin. In the present invention, a fingerprint recognition module identifies, through a driver IC, an impedance value of an ultrasonic wave reflected from a finger and identifies a fake fingerprint on the basis of a changed impedance value, and determines a fake fingerprint by measuring an impedance value in an ultrasonic wave which is emitted from the fingerprint recognition module, collides with a fake fingerprint, and is then reflected therefrom. Therefore, the present invention can more accurately recognize a fingerprint than a conventional method of recognizing a fingerprint by distinguishing between x, y, z vectors thereof and, through accurate identification of a fake fingerprint, can prevent a harmful consequence which may be caused by an authentication of the fake fingerprint.

2 Claims, 5 Drawing Sheets

(56) References Cited

U.S. PATENT DOCUMENTS

| | | | |
|---|---|---|---|
| 9,953,233 B2 | 4/2018 | Du et al. | |
| 2016/0070967 A1* | 3/2016 | Du | G06T 7/32 |
| | | | 382/124 |
| 2016/0267314 A1* | 9/2016 | Ohtsuka | G06F 21/35 |
| 2016/0313439 A1* | 10/2016 | Min | G06K 9/0002 |
| 2017/0090024 A1* | 3/2017 | Kitchens, II | A61B 8/0858 |
| 2018/0196984 A1* | 7/2018 | Ahn | G06K 9/62 |

FOREIGN PATENT DOCUMENTS

| | | |
|---|---|---|
| JP | 2000-172833 A | 6/2000 |
| JP | 2000-194848 A | 7/2000 |
| JP | 2005-143804 A | 6/2005 |
| KR | 10-2010-0029604 A | 3/2010 |
| KR | 10-2013-0060875 A | 6/2013 |
| KR | 10-2017-0048390 A | 5/2017 |
| KR | 10-2017-0077988 A | 7/2017 |

* cited by examiner

| Normal | Impedance(Ohm) | θz(°) | Human Impedance(Ohm) | θz(°) | Gelatin Impedance(Ohm) | θz(°) | Silicon Impedance(Ohm) | θz(°) |
|---|---|---|---|---|---|---|---|---|
| | 243.64 | -4.9982 | | | | | | |
| #1 | | | 283.38 | -16.563 | 266.89 | -4.172 | 259.26 | -5.1581 |
| #2 | | | 284.21 | -19.873 | 261.41 | -3.6322 | 254.57 | -3.7687 |
| #3 | | | 281.31 | -15.655 | 260.94 | -4.981 | 249.54 | -3.3582 |
| #4 | | | 274.89 | -20.242 | 266.55 | -5.7496 | 256.03 | -4.8002 |
| #5 | | | 273.3 | -14.45 | 263.48 | -3.547 | 256.26 | -4.3496 |
| #6 | | | 280.23 | -17.446 | 271.37 | -6.9951 | 253.34 | -2.633 |
| #7 | | | 276.44 | -14.948 | 271.98 | -6.3184 | 253.4 | -3.8406 |
| #8 | | | 281.36 | -15.756 | 258.02 | -3.1722 | 249 | -3.5379 |
| #9 | | | 270.41 | -12.432 | 271.31 | -7.7939 | 248.17 | -3.2077 |
| #10 | | | 277.77 | -15.909 | 260.92 | -3.1839 | 260.3 | -5.5598 |
| Avz | | | 278.33 | -16.3274 | 265.287 | -4.95451 | 253.987 | -4.02138 |
| Dev | | | 34.69 | -11.3292 | 21.647 | 0.04369 | 10.347 | 0.97682 |

FIG. 4

APPARATUS AND METHOD FOR IDENTIFYING FAKE FINGERPRINT BY USING IMPEDANCE

TECHNICAL FIELD

The present disclosure relates to an apparatus and method for identifying a fake fingerprint by using impedance, and more particularly, to an apparatus and method for identifying a fake fingerprint by using impedance, in which the impedance of a fake fingerprint made up of silicon or gelatin is measured and the fingerprint is identified as a live fingerprint or a fake fingerprint based on the impedance measurement.

BACKGROUND ART

Ridges are formed along the locations of sweat glands on the fingers or toes among the body parts of the human body, and valleys are formed between the ridges. In other words, it may be said that the ridges of a fingerprint are raised portions of the epidermis along sweat glands on a finger or a toe. Therefore, the ridges of the fingerprint bear small openings known as sweat pores that allow sweat to exit from the sweat glands.

These fingerprints are unique to individuals, even to identical twins, and thus serve as an identification means that uniquely identify a particular person.

Conventionally, such a fingerprint was used as an authentication means rather than an identification means for identifying a specific person. That is, after a person to be authenticated is identified by a separate medium or identity (ID), a fingerprint is authenticated to verify the person in the conventional fingerprint authentication. Therefore, there are continuous attempts to falsify a fingerprint and thus steal another individual's identity.

However, it is relatively easy to forge and alter a fingerprint. In the conventional fingerprint recognition technology, when fingerprint recognition is attempted by replicating a fingerprint, using a material having physical, chemical, and electrical properties similar to those of the epidermis of the human body, it is very difficult to exclude such a replicated fingerprint. For example, when a fingerprint is replicated using gummy very similar to the epidermal composition of the human body, it is very difficult to exclude the replicated fingerprint with the conventional fingerprint recognition technology.

Techniques for excluding a replicated fingerprint include, for example, Japanese Laid-Open Patent No. 2000-123143, Japanese Laid-Open Patent Publication No. Heisei 10-302047, Japanese Laid-Open Patent Publication No. 2000-194848, and Japanese Laid-Open Patent Publication No. 2000-172833.

However, Japanese Laid-Open Patent Publication No. 2000-123143 or Japanese Laid-Open Patent Publication No. Heisei 10-302047 discloses that it is determined whether a specimen is from a living body based on the current value, capacitance, and electrical resistance of the specimen, which makes it difficult to exclude a replicated fingerprint made of a material with physical, chemical and electrical properties similar to those of the epidermis. Moreover, Japanese Laid-Open Patent Publication No. Heisei 10-370295 discloses that a fake fingerprint is identified by checking whether a capacitive sensor reacts, and Japanese Laid-Open Patent Publication No. 2000-172833 discloses that it is determined only whether a specimen is from a living body based on the frequency characteristic of impedance, which is an electrical property. These techniques also have limitations in excluding a replicated fingerprint made of a material with physical, chemical and electrical properties similar to those of the epidermis.

The impedance of the human body is different by age, gender, body part, and moisture content. Typically, about 2500Ω is used as a reference based on which the impedance of the human body is determined, but in reality, a very large difference is observed from each individual. For example, a worker working with a tool has a hand from which an impedance of approximately 10,000Ω is measured, while a soft skin like an office worker's hand has an impedance of about 1,000Ω. This implies that the human body's impedance fluctuates significantly. Therefore, although it may be relatively easy to identify a living body simply by impedance, it is very difficult to determine whether some impedance is from a specific person by quantifying the impedance of the specific user.

To overcome the above problem, Korean Laid-Open Patent Publication No. 2017-0077988 (laid open on Jul. 7, 2017) entitled "method of identifying fingerprint of living body by using skin impedance" discloses a method performed in an apparatus including a sensor module in which a fingerprint sensor that senses a fingerprint based on a skin contact is combined with an electrode unit including two or more electrodes capable of contacting the skin during the fingerprint sensing. The method includes a first step for setting at least one of a current path, a contact voltage, a frequency, or a current density, which is controllable by the electrode unit, as a controlled variable, and setting at least one of a current duration, a skin humidity, a contact area, a contact pressure, or temperature, which is measurable by the fingerprint sensor, as a measured variable during contact-based fingerprint sensing, a second step for sensing an impedance value of the skin contacting the electrode unit and, at the same time, measuring the at least one measured variable during fingerprint recognition, while controlling the electrode unit based on the set controlled variable, during sensing a fingerprint through the fingerprint sensor, a third step for accumulating a combination of the sensed impedance value and the measured variable in a predetermined storage area during matching authentication of the sensed fingerprint pattern, and when a predetermined number of or more combinations are accumulated, calculating a valid impedance range associated with at least one measured variable or verifying a pre-registered valid impedance range by numerically interpreting or statistically processing the accumulated combinations of impedance values and measured variables, and a fourth step for, when the valid impedance range is verified, authenticating whether the sensed impedance value is within the verified valid impedance range.

The method further includes a step for, when the fingerprint pattern is matching-authenticated and the sensed impedance value falls within the valid impedance range, processing authentication of a live fingerprint of a user as successful.

According to the prior art including the above steps, a live fingerprint is authenticated by setting at least one of a current duration, a skin humidity, a contact area, a contact pressure, or temperature as a measured variable and measuring an impedance value based on the measured variable.

However, even when a fake fingerprint made up of silicon or gelatin, worn on a finger is measured, an impedance value is generated and thus the fake fingerprint is mistaken as a live fingerprint, leading to successful authentication.

DISCLOSURE

Technical Problem

An aspect of the present disclosure devised to solve the conventional problem is to provide an apparatus and method for identifying a fake fingerprint by using impedance, in which a live fingerprint or a fake fingerprint is identified by measuring the impedance value of a fake fingerprint made up of silicon or gelatin.

Technical Solution

In an aspect of the present disclosure, an apparatus for identifying a fake fingerprint by using impedance is provided.

The apparatus includes a fingerprint recognition module configured to oscillate an ultrasonic wave to be reflected and read the reflected ultrasonic wave, for reading a pattern of a live fingerprint or a fake fingerprint, a driver integrated circuit (IC) electrically coupled to the fingerprint recognition module to measure an impedance value of the ultrasonic wave applied from the fingerprint recognition module, and configured to measure the impedance value of the ultrasonic wave, a decider configured to determine whether the impedance value applied from the driver IC is within a preset impedance value, a memory storing actual impedance values to provide the preset impedance value to the decider and enable the decider to compare and determine an impedance value, and an authenticator electrically coupled to the decider, for user authentication, and configured to perform authentication according to the impedance value compared by the decider.

The decider may be configured to store impedance values for each user subjected to fingerprint authentication in the memory and set a range for each user based on the stored impedance values.

The memory may be configured to store impedance values of live fingerprints to allow setting of an impedance value range.

In another aspect of the present disclosure, a method of identifying a fake fingerprint by using impedance is provided.

The method includes identifying an impedance value of an ultrasonic wave reflected from a finger through a driver IC in a fingerprint recognition module, and identifying a fake fingerprint based on a variation in the impedance value.

The measuring of the impedance value may include identifying the fake fingerprint in the driver IC based on properties including a speed decrease and refraction caused by an air layer formed between the epidermis of the finger wearing the fake fingerprint and the fake fingerprint.

The fake fingerprint may be formed of rubber, silicon, or gelatin, and identified in the driver IC based on an impedance value of the fake fingerprint different from an impedance value of a human body.

In another aspect of the present disclosure, a method of identifying a fake fingerprint by using impedance is provided.

The method includes a step of S10 for bringing a fake fingerprint worn on a finger into close contact with a fingerprint recognition module, a step of S20 for oscillating an ultrasonic wave to the fake fingerprint by the fingerprint recognition module, a step of S30 for receiving the ultrasonic wave responded from the fake fingerprint by the fingerprint recognition module, a step of S40 for applying the ultrasonic wave received at the fingerprint recognition module to a driver IC, a step of S50 for measuring an impedance value of the ultrasonic wave by the driver IC, a step of S60 for determining whether the measured impedance value is within a configured range by comparing the measured impedance value with a preset impedance value by a decider, and a step of S70 for, when the measured impedance value is within the configured range of impedance values, determining that the fingerprint is a live fingerprint and authenticating the fingerprint, and when the fingerprint is determined to be the fake fingerprint, performing fingerprint recognition again.

The fake fingerprint may be formed of rubber, silicon, or gelatin, and the step of S30 may include identifying whether the fake fingerprint is a fake fingerprint based on an impedance value of the fake fingerprint different from an impedance value of a human body.

The step of S50 may include identifying the fake fingerprint based on properties including a speed decrease and refraction caused by an air layer formed between the epidermis of the finger wearing the fake fingerprint and the fake fingerprint.

Advantageous Effects

The present disclosure has the effect that because a fake fingerprint is identified by measuring an impedance value in an ultrasonic wave which has been oscillated, bumped into, and then responded from the fake fingerprint, a fingerprint may be identified more accurately than in a conventional method of identifying a fingerprint by identifying an (x, y, z) vector.

Further, the present disclosure has the effect that harms arising from wrong authentication of a fake fingerprint may be prevented by accurately identifying the fake fingerprint.

Further, the present disclosure has the effect that because a fake fingerprint is identified by determining whether the impedance value of an ultrasonic wave oscillated from a fingerprint recognition module and then responded is within a configured range through a driver integrated circuit (IC), an actual user is identified and authenticated simultaneously.

BRIEF DESCRIPTION OF THE DRAWINGS

FIG. 4 is a table comparing impedance values of live fingerprints with impedance values of fake fingerprints made up of gelatin and silicon in the apparatus for identifying a fake fingerprint by using impedance according to the present disclosure;

BEST MODE

An apparatus and method for identifying a fake fingerprint by using impedance according to the present disclosure will be described below in detail with reference to the attached drawings.

The apparatus and method for identifying a fake fingerprint by using impedance according to the present disclosure are implemented as illustrated in FIGS. 1 to 8.

Figure 1:
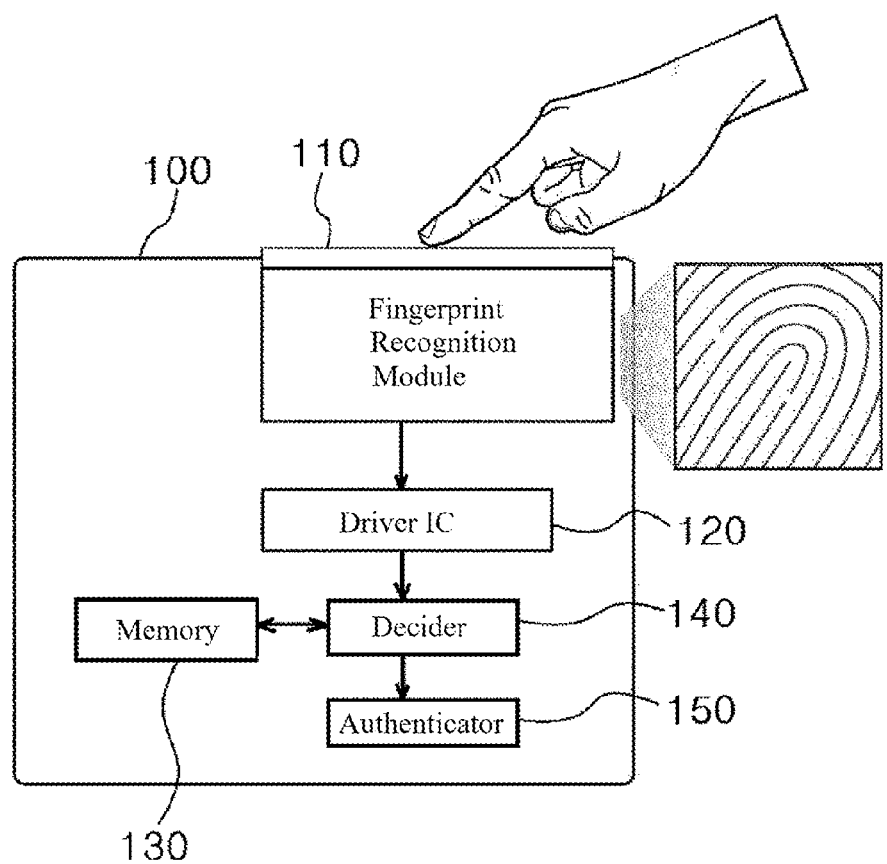
FIG. 1 is a block diagram illustrating an apparatus for identifying a fake fingerprint by using impedance according to the present disclosure.
Figure 2:
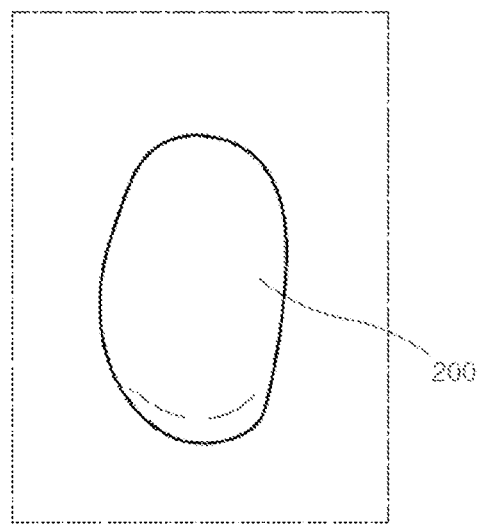
FIG. 2 is a diagram illustrating a fake fingerprint illustrated in FIG. 1.
Figure 3:
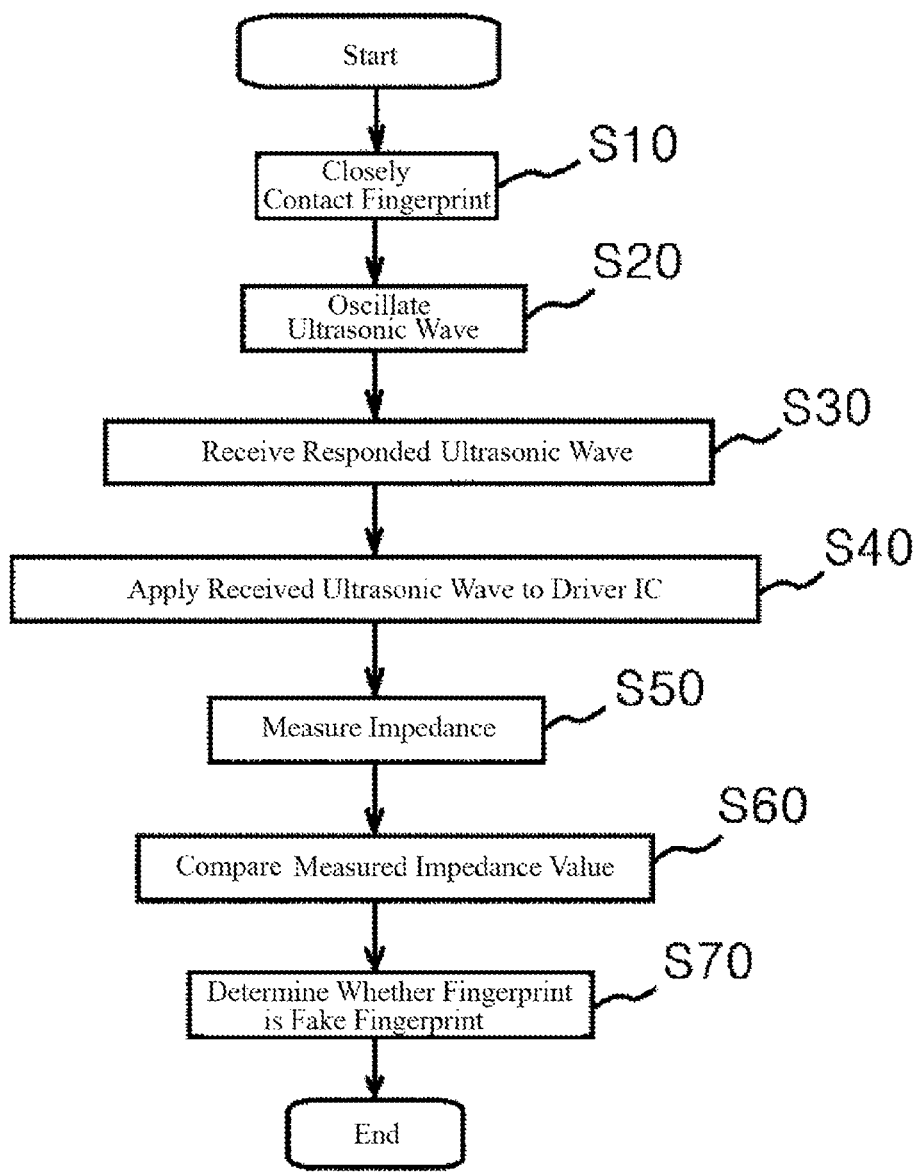
FIG. 3 is a flowchart illustrating a method of identifying a fake fingerprint by using impedance according to the present disclosure.
Figure 5:
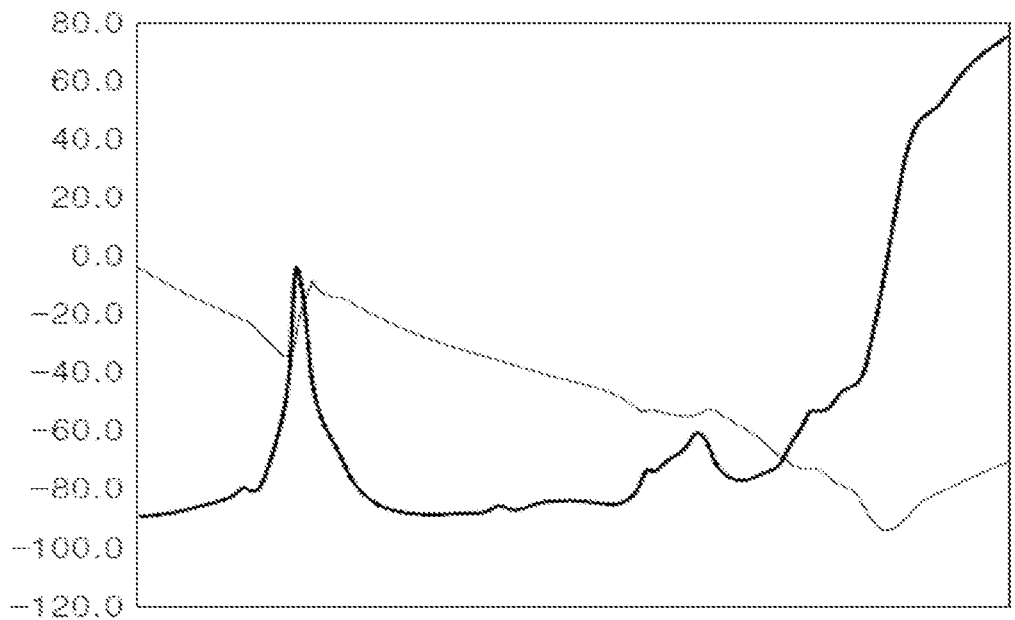
FIG. 5 is a graph illustrating measurements from a fingerprint recognition module, when a live fingerprint or a fake fingerprint is not touched against the apparatus for identifying a fake fingerprint by using impedance according to the present disclosure.
Figure 6:
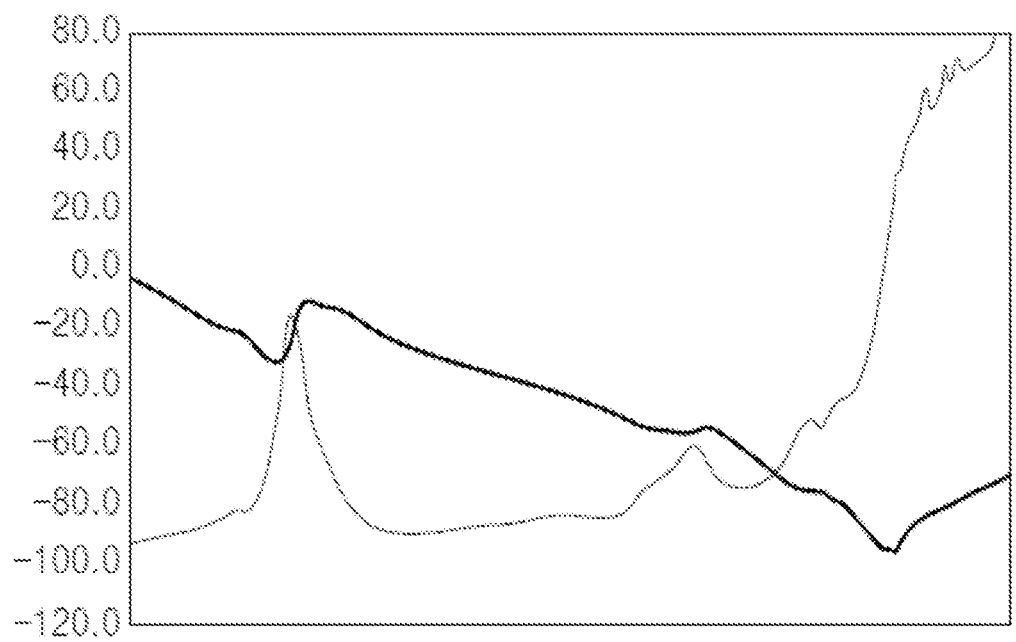
FIG. 6 is a graph illustrating impedance measurements, when a fingerprint is touched against the apparatus for identifying a fake fingerprint by using impedance according to the present disclosure.
Figure 7:
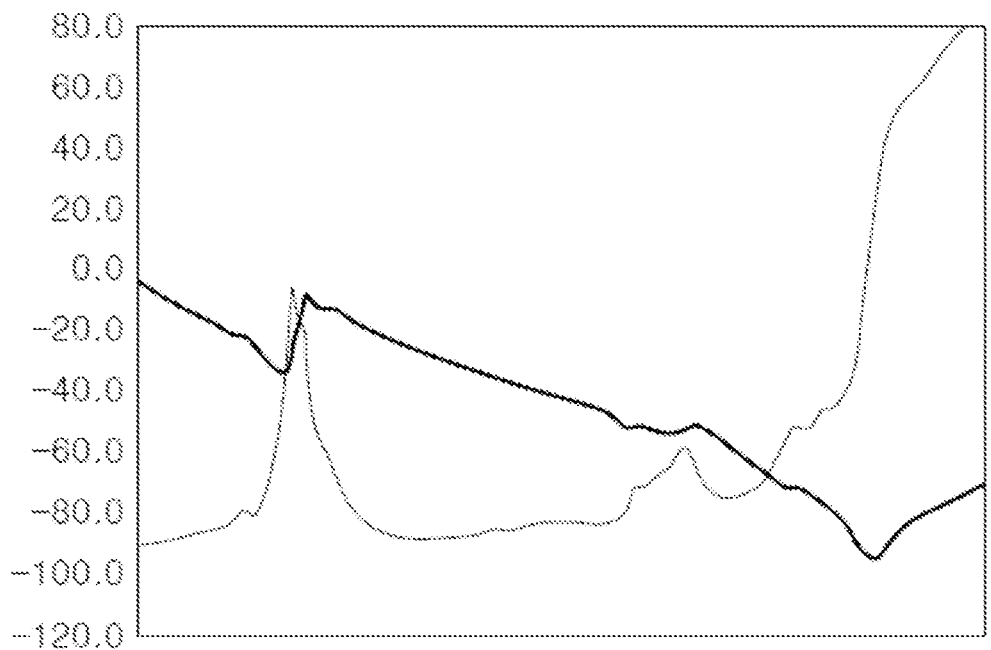
FIG. 7 is a graph illustrating impedance measurements, when a fake fingerprint made up of gelatin is touched against the apparatus for identifying a fake fingerprint by using impedance according to the present disclosure.
Figure 8:
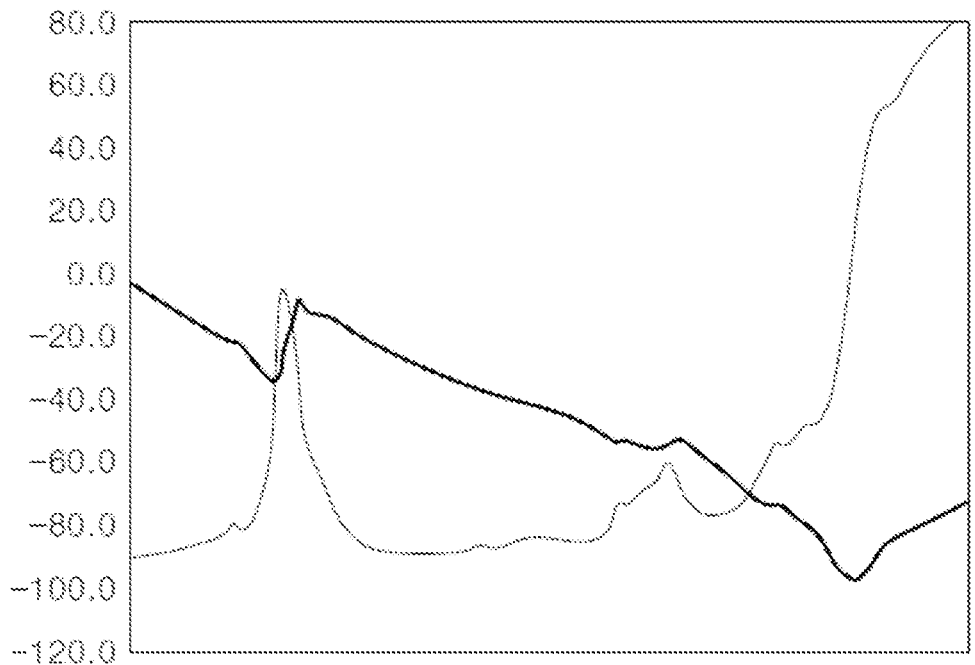
FIG. 8 is a graph illustrating impedance measurements, when a fake fingerprint made up of silicon is touched against the apparatus for identifying a fake fingerprint by using impedance according to the present disclosure.

FIG. 1 is a block diagram illustrating an apparatus for identifying a fake fingerprint by using impedance according to the present disclosure, FIG. 2 is a diagram illustrating a fake fingerprint illustrated in FIG. 1, FIG. 3 is a flowchart illustrating a method of identifying a fake fingerprint by using impedance according to the present disclosure, FIG. 4 is a table comparing impedance values of live fingerprints with impedance values of fake fingerprints made up of gelatin and silicon in the apparatus for identifying a fake fingerprint by using impedance according to the present disclosure, FIG. 5 is a graph illustrating measurements from a fingerprint recognition module, when a live fingerprint or a fake fingerprint is not touched against the apparatus for identifying a fake fingerprint by using impedance according to the present disclosure, FIG. 6 is a graph illustrating impedance measurements, when a fingerprint is touched against the apparatus for identifying a fake fingerprint by using impedance according to the present disclosure, FIG. 7 is a graph illustrating impedance measurements, when a fake fingerprint made up of gelatin is touched against the apparatus for identifying a fake fingerprint by using impedance according to the present disclosure, and FIG. 8 is a graph illustrating impedance measurements, when a fake fingerprint made up of silicon is touched against the apparatus for identifying a fake fingerprint by using impedance according to the present disclosure.

Referring to FIGS. 1 to 8, an apparatus 100 for identifying a fake fingerprint by using impedance according to the present disclosure includes a fingerprint recognition module 110 that reads an ultrasonic wave which has been oscillated and reflected to read the shape of a live fingerprint or a fake fingerprint 200, a driver integrated circuit (IC) 120 that is electrically coupled to the fingerprint recognition module 110 to measure the impedance value of the ultrasonic wave applied from the fingerprint recognition module 110, and measures the impedance value, a decider 130 that determines whether the impedance value of the fake fingerprint 200 received from the driver IC 120 is within a predetermined impedance value, a memory 140 that stores actual impedance values to provide preset impedance values to the decider 130 so that the decider 130 may compare and determine impedance values, and an authenticator 150 that is electrically coupled to the decider 130, for user authentication, and performs authentication according to the impedance values compared by the decider 130.

The fingerprint recognition module 110 includes an ultrasonic fingerprint sensor using ultrasonic waves.

The fingerprint recognition module 110 may classify a variation in an ultrasonic wave oscillated, bumping into, and reflected from the fingerprint of a finger as a vector on the x, y, and z axes, recognize the pattern of the fingerprint based on the classified vector data, analyze the pattern of the fingerprint, and compare the analyzed fingerprint pattern with preset fingerprint data, to determine whether the fingerprint is a live fingerprint or the fake fingerprint 200.

The fingerprint recognition module 110 oscillates an ultrasonic wave, so that the fake fingerprint 200 may be identified by identifying the impedance value of the ultrasonic wave which has been responded from the fingerprint.

The decider 130 stores impedance values for each user for which fingerprint authentication is performed, in the memory 140. Further, the decider 130 may set an impedance range for each user by storing impedance values by use in the memory 140, when fingerprints are authenticated.

The setting of an impedance range for each user may lead to more accurate fingerprint authentication because the impedance values of live fingerprints and fake fingerprints 200 are measured, the differences between the impedance values are determined, and the impedance values of the live fingerprints are set outside the impedance values of the fake fingerprints 200.

The memory 140 stores fingerprint data of users and impedance values of the fingerprint data, so that the decider 130 may compare a fingerprint pattern recognized through the fingerprint recognition module 110.

Further, the memory 140 stores the impedance values of fingerprint data of each user. Thus, when the fingerprint recognition module 110 reads a fake fingerprint 200 of the same pattern, the fake fingerprint 200 may be identified by applying an accurate impedance value to the live fingerprint.

The method of identifying a fake fingerprint by using impedance according to the present disclosure is characterized in that the fingerprint recognition module 110 determines the impedance value of an ultrasonic wave reflected from a finger through the driver IC 120, and the fake fingerprint 200 is identified based on a variation in the impedance value.

Further, the impedance value of the fake fingerprint 200 worn on a finger is measured, and the fake fingerprint 200 is identified by the driver IC 120 based on properties including a speed decrease and refraction caused by an air layer between the epidermis of the finger and the fake fingerprint 200.

The fake fingerprint 200 is made up of rubber, silicon, or gelatin, and thus the driver IC 120 identifies the fake fingerprint 200 by the impedance value of the fake fingerprint 200 distinguishable from the impedance values of human bodies.

The method of identifying a fake fingerprint by using impedance according to the present disclosure will be described in greater detail.

The method includes bringing the fake fingerprint 200 worn on a finger into close contact with the fingerprint recognition module 110 (S10), oscillating an ultrasonic wave to the fake fingerprint 200 by the fingerprint recognition module 110 (S20), receiving the ultrasonic wave responded from the fake fingerprint 200 by the fingerprint recognition module 110 (S30), applying the ultrasonic wave received at the fingerprint recognition module 110 to the driver IC 120 (S40), measuring the impedance value of the ultrasonic wave by the driver IC 120 (S50), determining whether the measured impedance value is within a configured range by comparing the measured impedance value with preset impedance values (S60), and when the measured impedance value is within the configured range of impedance values, determining that the fingerprint is a live fingerprint and authenticating the fingerprint, and when the fingerprint is determined to be the fake fingerprint 200, performing fingerprint recognition again (S70).

The method of identifying a fake fingerprint by using impedance, including the above steps is characterized in that the fingerprint recognition module 110 determines the impedance value of an ultrasonic wave reflected from a finger through the driver IC and the fake fingerprint 200 is identified based on the changed impedance value.

Further, the impedance value of the fake fingerprint 200 worn on a finger is measured, and the fake fingerprint 200 is identified by the driver IC 120 based on properties including a speed decrease and refraction caused by an air layer between the epidermis of the finger and the fake fingerprint 200.

The fake fingerprint 200 is made up of rubber, silicon, or gelatin, and thus the driver IC 120 identifies the fake fingerprint 200 by the impedance value of the fake fingerprint 200 distinguishable from the impedance values of human bodies.

Impedance values may be stored on a user basis in the memory. When a fingerprint of a user is recognized, with the impedance values stored for the respective users, it may be determined more accurately whether the fingerprint is a live one. Thus, the fake fingerprint 200 is identified accurately.

To store data for each user as such, the ID of each user is input before a fingerprint is recognized. Therefore, input per-ID data may be compared with the stored data, and thus identified.

The impedance values of a live fingerprint and a fake fingerprint are measured to be different in the above method.

That is, on the assumption that a response speed is 100 ms for a person, the fake fingerprint 200 has a lower response speed of 200 ms to 400 ms. Accordingly, different impedance values are obtained in view of the properties of ultrasonic waves.

In other words, ultrasonic waves travel at 340 m/s close to a sound speed in the air, at 1500 m/s in water, and at 6000 m/s in a solid rigid substance.

The differences between the response speeds of the ultrasonic waves results in different impedance values. This is because an air layer is formed between a fake fingerprint worn on a finger and the finger, the ultrasonic waves travel at a different speed.

The air layer between the epidermis of the finger and the fake fingerprint 200 drops the speed of the ultrasonic waves and refracts the ultrasonic waves. Therefore, the impedance of the responded ultrasonic waves becomes different.

That is, FIG. 5 is a graph illustrating impedance measurements, when a live fingerprint or the fake fingerprint 200 is not touched against the fingerprint recognition module 110.

FIG. 6 is a graph illustrating impedance measurements, when a live fingerprint is touched against the fingerprint recognition module 110. FIG. 7 is a graph illustrating impedance measurements, when a fake fingerprint made up of gelatin is touched.

FIG. 8 is a graph illustrating impedance measurements, when a fake fingerprint 200 made up of silicon is touched against the fingerprint recognition module 110.

As illustrated in FIGS. 5 to 8, impedance values measured when a live fingerprint or the fake fingerprint 200 is not touched against the fingerprint recognition module 110 are different from impedance values obtained from the fake fingerprints 200 made up of gelatin and silicon. Therefore, a fake fingerprint is easily identified.

Because user authentication is performed by comparing the impedance value of a live fingerprint with the impedance value of a fake fingerprint, each individual user is accurately authenticated, thereby preventing an unauthorized person from stealing the user's identity.

Further, the accurate identification of a fake fingerprint may prevent harms caused by wrong authentication of the fake fingerprint.

Embodiments of the present disclosure disclosed in the specification and drawings are only presented as specific examples for clarity and are not intended to limit the scope of the present disclosure. In addition to the embodiments disclosed herein, other modifications can be made without departing from the scope and spirit of the present disclosure, and the modifications also belong to the category of the present disclosure.

DESCRIPTION OF REFERENCE NUMERALS

100: fingerprint recognition apparatus
110: fingerprint recognition module
120: driver IC
130: decider
140: memory
150: authenticator
200: fake fingerprint

INDUSTRIAL APPLICABILITY

The present disclosure relates to an apparatus and method for identifying a fake fingerprint by using impedance. The apparatus and method are characterized in that it is determined whether a fake fingerprint made up of silicon or gelatin is a live fingerprint or a fake fingerprint by measuring the impedance value of the fake fingerprint, and the fingerprint recognition module measures an impedance value in an ultrasonic wave which has been reflected from a finger through the driver IC and identifies the fake fingerprint based on a variation in the impedance value. Because the fake fingerprint is identified by measuring the impedance value of the ultrasonic wave oscillated from the fingerprint recognition module, bumping into, and responded from the fake fingerprint, a fingerprint may be identified more accurately than in a conventional method of identifying a fingerprint by identifying an (x, y, z) vector. Further, harms arising from wrong authentication of a fake fingerprint may be prevented by accurately identifying the fake fingerprint.

The invention claimed is:
1. An apparatus for identifying a fake fingerprint by using impedance, the apparatus comprising:
  a fingerprint recognition ultrasonic oscillator (110) configured to oscillate an ultrasonic wave to be reflected and read the reflected ultrasonic wave, for reading a pattern of a live fingerprint or a fake fingerprint;
  a driver integrated circuit (IC) (120) electrically coupled to the fingerprint recognition ultrasonic oscillator (110) to measure an impedance value of the ultrasonic wave applied from the fingerprint recognition ultrasonic oscillator (110) and reflected and responded from a fingerprint, and configured to measure the impedance value of the ultrasonic wave;
  a decider circuit (130) configured to determine whether the impedance value measured by the driver IC (120) is within a preset impedance value;
  a memory (140) storing the preset impedance value for each of users subjected to fingerprint authentication to be provided to the decider circuit (130) and enabling the decider circuit (130) to compare and determine an impedance value, wherein the preset impedance values stored in the memory (140) include:

non-touch impedances values when the live fingerprint or the fake fingerprint is not touched against the fingerprint recognition ultrasonic oscillator (110);

live-fingerprint impedance values when the live fingerprint is touched against the fingerprint recognition ultrasonic oscillator (110); and fake-fingerprint impedance values when the fake fingerprint worn on a finger of each user is touched against the fingerprint recognition ultrasonic oscillator (110), the fake fingerprint being made up of silicon or gelatin, wherein the driver IC (120) measures the fake-fingerprint impedance values of the ultrasonic wave, applied from the fingerprint recognition ultrasonic oscillator (110) and then reflected and responded from the fake fingerprint, based on properties including a speed decrease and refraction caused by an air layer formed between the fake fingerprint and an epidermis of the finger wearing the fake fingerprint; and an authenticator circuit (150) electrically coupled to the decider circuit (130), for user authentication, and configured to perform authentication according to the impedance value compared by the decider circuit (130);

wherein the decider circuit (130) is configured to store the preset impedance values for each user subjected to fingerprint authentication in the memory (140) and set an impedance range for each user based on the stored preset impedance values;

wherein the decider circuit (130) sets the impedance range for each user such that differences between the live-fingerprint impedance values and the fake-fingerprint impedance values are determined and the live-fingerprint impedance values are set outside the fake-fingerprint impedance values, and wherein the decider circuit (130) compares the measured impedance value with the preset impedance values, when the measured impedance value is within a range of the live-fingerprint impedance values, the decider circuit (130) determines that the fingerprint is a live fingerprint and the authenticator circuit (150) authenticates the fingerprint, and when the measured impedance value is within a range of the fake-fingerprint impedance values, the decider circuit (130) determines that the fingerprint is a fake fingerprint.

2. A method of identifying a fake fingerprint by using impedance, the method comprising:

a step of storing preset impedance values for each of users subjected to fingerprint authentication in a memory (140) and setting an impedance range for each of the users based on the stored impedance values, the preset impedance values including non-touch impedances values when a live fingerprint or a fake fingerprint is not touched against a fingerprint recognition ultrasonic oscillator (110), live-fingerprint impedance values when the live fingerprint is touched against the fingerprint recognition ultrasonic oscillator (110), and fake-fingerprint impedance values when the fake fingerprint worn on a finger of each of the users is touched against the fingerprint recognition ultrasonic oscillator (110), the fake fingerprint being made up of silicon or gelatin, wherein the setting of the impedance range for each of the users is such that differences between the live-fingerprint impedance values and the fake-fingerprint impedance values are determined and the live-fingerprint impedance values are set outside the fake-fingerprint impedance values;

a step of S10 for bringing a fingerprint of a user into close contact with the fingerprint recognition ultrasonic oscillator (110);

a step of S20 for oscillating an ultrasonic wave to the fake fingerprint (200) by the fingerprint recognition ultrasonic oscillator (110);

a step of S30 for receiving the ultrasonic wave reflected and responded from the fingerprint by the fingerprint recognition ultrasonic oscillator (110);

a step of S40 for applying the ultrasonic wave received at the fingerprint recognition ultrasonic oscillator (110) to a driver IC (120);

a step of S50 for measuring an impedance value of the ultrasonic wave by the driver IC (120);

a step of S60 for determining whether the measured impedance value is within a configured range by comparing the measured impedance values with the preset impedance values by a decider circuit (130); and a step of S70 for, by the decider circuit (130), when the measured impedance value is within a range of the live-fingerprint impedance values, determining that the fingerprint is a live fingerprint and authenticating the fingerprint, and when the measured impedance value is within a range of the fake-fingerprint impedance values, determining that the fingerprint is a fake fingerprint, and performing fingerprint recognition again;

wherein the step of S50 comprises identifying the fake fingerprint (200) based on properties including a speed decrease and refraction caused by an air layer formed between the epidermis of the finger wearing the fake fingerprint (200) and the fake fingerprint (200).

* * * * *